(12) United States Patent
Wagle et al.

(10) Patent No.: US 12,473,828 B2
(45) Date of Patent: Nov. 18, 2025

(54) METHODS FOR QUANTIFYING AND TRACKING AMINE-BASED SHALE INHIBITORS IN DRILLING FLUIDS

(71) Applicant: SAUDI ARABIAN OIL COMPANY, Dhahran (SA)

(72) Inventors: Vikrant Wagle, Dhahran (SA); Omprakash Pal, Dhahran (SA); Abdullah S. Al-Yami, Dhahran (SA); Khawlah A. Alanqari, Al-Khubar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 412 days.

(21) Appl. No.: 18/170,752

(22) Filed: Feb. 17, 2023

(65) Prior Publication Data

US 2024/0280016 A1  Aug. 22, 2024

(51) Int. Cl.
*E21B 49/00* (2006.01)
*C09K 8/54* (2006.01)
*G01N 15/06* (2024.01)

(52) U.S. Cl.
CPC .............. *E21B 49/005* (2013.01); *C09K 8/54* (2013.01); *G01N 15/06* (2013.01)

(58) Field of Classification Search
CPC .......... E21B 49/005; C09K 8/54; G01N 15/06
See application file for complete search history.

(56) References Cited

U.S. PATENT DOCUMENTS

| | | | |
|---|---|---|---|
| 2,761,843 A | 9/1956 | Brown | |
| 4,493,771 A | 1/1985 | Wilson et al. | |
| 4,515,708 A | 5/1985 | Haslegrave et al. | |
| 4,717,488 A | 1/1988 | Seheult et al. | |
| 5,057,467 A | 10/1991 | Croft | |
| 5,558,171 A | 9/1996 | McGlothlin et al. | |
| 5,593,953 A | 1/1997 | Malchow, Jr. | |
| 5,641,385 A | 6/1997 | Croft et al. | |

(Continued)

FOREIGN PATENT DOCUMENTS

| CN | 1120439 A | * | 4/1996 | ............. A61K 38/16 |
|---|---|---|---|---|
| CN | 104743576 A | * | 7/2015 | |

(Continued)

OTHER PUBLICATIONS

Dakin, H.D., "Reinecke Salt", Organic Syntheses, Coll. vol. 2, 1943, p. 555; vol. 15, 1935, p. 74 (3 pages).

(Continued)

*Primary Examiner* — Michael J Dalbo
*Assistant Examiner* — Kaleria Knox
(74) *Attorney, Agent, or Firm* — Osha Bergman Watanabe & Burton LLP

(57) ABSTRACT

Described is a method for quantifying and tracking an amine-based shale inhibitor in a drilling fluid through UV-visible spectroscopy. A correlation is determined between varying concentrations of an amine-based shale inhibitor in a water-based drilling fluid sample and an ultraviolet (UV)-visible absorption intensity. A calibration plot is generated based on the correlations. Samples of a circulating drilling fluid having an unknown concentration of amine-based shale inhibitor are obtained. Using the calibration plot, the concentration of amine-based shale inhibitor in the samples of the circulating drilling fluid is estimated.

15 Claims, 5 Drawing Sheets

(56) References Cited

U.S. PATENT DOCUMENTS

| | | | |
|---|---|---|---|
| 6,153,049 | A | 11/2000 | Croft |
| 6,312,560 | B1 | 11/2001 | Croft |
| 7,863,228 | B2 | 1/2011 | Loper et al. |
| 9,434,911 | B2 | 9/2016 | Bennett et al. |
| 9,650,559 | B2 | 5/2017 | Nelson |
| 9,884,985 | B2 | 2/2018 | Al-Subhi et al. |
| 9,951,261 | B2 | 4/2018 | Nelson |
| 10,480,278 | B1 | 11/2019 | Sodhi et al. |
| 11,029,246 | B1 | 6/2021 | Jamison et al. |
| 11,492,536 | B2 | 11/2022 | Alkhalaf et al. |
| 11,535,787 | B2 | 12/2022 | Alkhalaf et al. |
| 11,566,157 | B2 | 1/2023 | Wagle et al. |
| 2016/0208158 | A1 | 7/2016 | Monahan et al. |
| 2021/0003002 | A1 | 1/2021 | May et al. |
| 2021/0405017 | A1 | 12/2021 | May et al. |
| 2022/0259486 | A1 | 8/2022 | Alkhalaf et al. |

FOREIGN PATENT DOCUMENTS

| | | | | | |
|---|---|---|---|---|---|
| CN | 107353884 | B | * | 6/2020 | ............ C09K 8/467 |
| CN | 110632062 | B | * | 1/2022 | .............. C12Q 1/46 |
| NO | 20211181 | A1 | * | 10/2021 | |
| WO | 2014123709 | A1 | | 8/2014 | |
| WO | 2014200671 | A2 | | 12/2014 | |
| WO | 2015031270 | A1 | | 3/2015 | |
| WO | 2020231410 | A1 | | 11/2020 | |
| WO | WO-2021002836 | A1 | * | 1/2021 | ........... C07C 49/733 |
| WO | WO-2021251990 | A1 | * | 12/2021 | ............. C09K 8/035 |

OTHER PUBLICATIONS

International Search Report issued for corresponding international patent application No. PCT/US2024/015768, mailed May 28, 2024 (5 pages).
Written Opinion issued for corresponding international patent application No. PCT/US2024/015768, mailed May 28, 2024 (7 pages).
A. Reinecke, "About Rhodanchromammonium compounds"; Annual. d. Chem. und Pharmacie, vol. 126, pp. 113-118 (1863). DOI: <https://10.1002/jlac.18631260116> (10 pages).

* cited by examiner

METHODS FOR QUANTIFYING AND TRACKING AMINE-BASED SHALE INHIBITORS IN DRILLING FLUIDS

BACKGROUND

Formations that contain hydratable shale or mixed layers of reactive clay can lead to wellbore instability issues during drilling operations. Shale inhibitors are used to limit the interaction of water with clay particles. Amine-based compounds are commonly used shale inhibitors in water-based drilling fluids. Amine-based shale inhibitors are typically added in predetermined concentrations in water-based drilling fluids. The shale inhibitors prevent the swelling and disintegration of shales, preventing problems during the drilling process, such as wellbore instability, viscosity buildup, high torque and drag, bit balling and stuck pipe, and wellbore caving. During the drilling process, the shale inhibitors are either consumed or may be lost to the formation.

Accordingly, there exists a need for quantifying and tracking active concentrations of amine-based shale inhibitors in drilling fluids in real-time conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for quantifying and tracking an amine-based shale inhibitor in a drilling fluid through UV-visible spectroscopy. For varying concentrations of an amine-based shale inhibitor, a correlation between a concentration of the amine-based shale inhibitor in a water-based drilling fluid sample and an ultraviolet (UV)-visible absorption intensity is determined. A calibration plot is generated from the correlations. Samples of a circulating drilling fluid having unknown concentrations of amine-based shale inhibitor are collected. The concentrations of amine-based shale inhibitor in the samples of the circulating drilling fluid are estimated using the calibration plot.

In another aspect, a plurality of water-based drilling fluid samples having a plurality of varying concentrations of the amine-based shale inhibitor are formulated.

In another aspect, a mud filtrate is collected from each water-based drilling fluid solution. An amount of each mud filtrate is mixed with an amount of an amine precipitating reagent, and each mixture is allowed to precipitate. A colored solution is collected from each precipitated mixture. UV-visible spectroscopy is performed on each colored solution to measure the UV-visible absorption intensity of each colored solution. The UV-visible absorption intensity of each colored solution decreases with an increase in concentration of the amine-based shale inhibitor.

In yet another aspect, the amine precipitating reagent is Reinecke's salt.

In another aspect, each colored solution is characterized by at least one absorption peak wavelength in a range of about 400 nanometers (nm) to about 800 nm.

In another aspect, the plurality of varying concentrations of amine-based shale inhibitor range from 0 pounds per barrel (ppb) to 20 ppb.

In another aspect, water-based drilling fluid samples having varying concentrations of an amine-based shale inhibitor are formulated. A mud filtrate is collected from each water-based drilling fluid solution, and the mud filtrate is mixed with an amine precipitating reagent and allowed to precipitate. A colored solution is collected from each precipitated mixture, and a chart of the colored solutions corresponding to amine-based shale inhibitor concentrations is prepared. Samples of a circulating drilling fluid having unknown concentrations of amine-based shale inhibitor are obtained. Using the chart, the concentrations of amine-based shale inhibitor in the samples of the circulating drilling fluid are estimated.

Other aspects and advantages of the claimed subject matter will be apparent from the following description and the appended claims.

DETAILED DESCRIPTION

In one aspect, embodiments disclosed herein relate to colorimetric methods for quantifying and tracking an amine-based shale inhibitor in a drilling fluid during drilling. The concentration of amine-based shale inhibitors in a water-based drilling fluid may be determined by reacting a solution of an amine shale inhibitor with an amine precipitating reagent. In one embodiment, the amine precipitating reagent is Reinecke's salt. The resulting solution may be characterized by ultraviolet (UV)-visible spectrophotometry to detect the amount of amine in the solution. Alternatively, the resulting solution may be characterized by visual observation.

Figure 1:
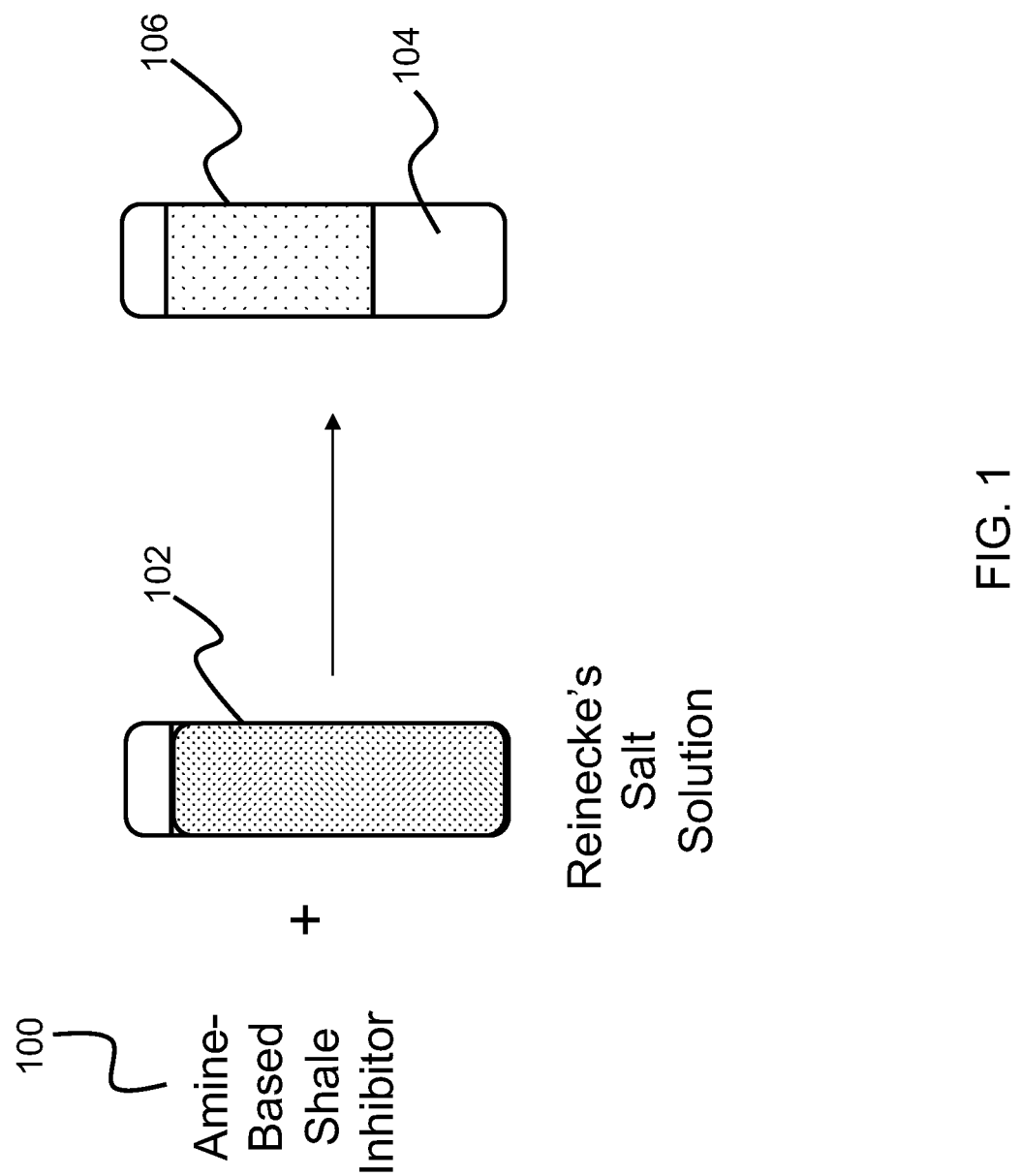
FIG. 1 illustrates an amine-based shale inhibitor reacted with a colored Reinecke's salt solution according to embodiments of the present disclosure.

Reinecke's salt is a commercially available dark-red crystalline compound (having the formula: $NH_4[Cr(NCS)_4(NH_3)_2] \cdot H_2O$) that is soluble in boiling water and ethanol. The salt may be used to precipitate primary, secondary, tertiary, and quaternary amines as their ammonium salts. In the method disclosed herein, varying concentrations of amine-based shale inhibitor 100 are reacted with a colored Reinecke's salt solution 102, as shown in FIG. 1. The reaction produces a precipitate 104 and a colored solution 106 that is lighter in color than the Reinecke's salt solution 102. The colored solution 106 may be collected from the precipitate and analyzed via colorimetric methods to estimate the concentration of amine-based shale inhibitor. The colored solution 106 may be collected by filtration, sedimentation, digestion, or by using a syringe fitted with a filter.

As can be appreciated by one skilled in the art, the method to collect the filtrate is not limited to the aforementioned techniques.

Figure 2:
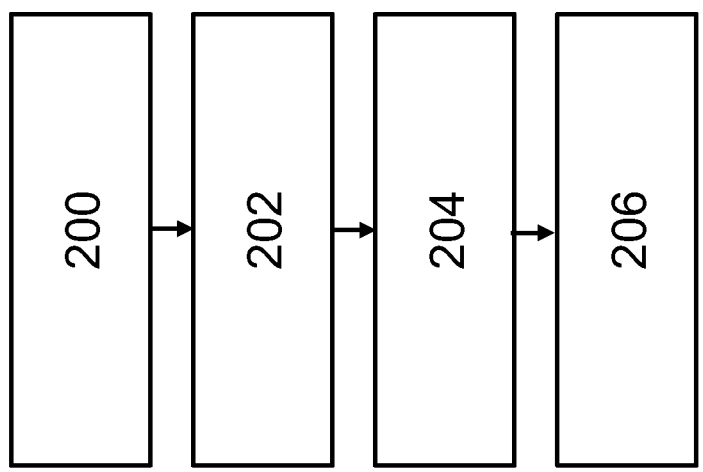
FIG. 2 illustrates a method for quantifying and tracking an amine-based shale inhibitor in a drilling fluid through UV-visible spectroscopy according to embodiments of the present disclosure.

In one embodiment, a relationship between varying amine concentrations in drilling fluid mixed with Reinecke's salt solution and absorption intensity by UV-visible spectroscopy is determined. FIG. 2 is a flow diagram illustrating a method for quantifying and tracking an amine-based shale inhibitor in a drilling fluid through UV-visible spectroscopy. In step 200, a correlation between a concentration of amine-based shale inhibitor in a water-based drilling fluid sample and UV-visible absorption intensity is determined for varying concentrations of amine-based shale inhibitor. A calibration plot of the correlations is generated in step 202. In step 204, one or more samples of circulating drilling fluid samples having an unknown concentration of amine-based shale inhibitor is obtained. Finally, the concentration of amine-based shale inhibitor in the one or more samples is estimated in step 206 so that effective shale inhibition can be achieved during drilling.

Figure 3:
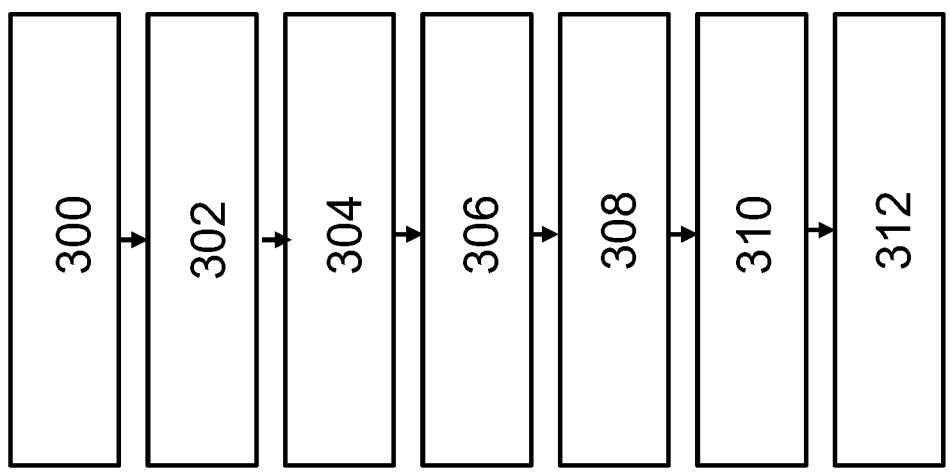
FIG. 3 illustrates a method for quantifying and tracking an amine-based shale inhibitor in a drilling fluid through visualization according to embodiments of the present disclosure.

In another embodiment, a relationship between varying amine concentrations in drilling fluid mixed with Reinecke's salt solution and visual observation of a color solution is determined. FIG. 3 is a flow diagram illustrating a method for quantifying and tracking an amine-based shale inhibitor in a drilling fluid through visualization. In step 300, water-based drilling fluid samples having varying concentrations of the amine-based shale inhibitor are formulated. A mud filtrate is collected from each water-based drilling fluid solution in step 302. In step 304, an amount of each mud filtrate is mixed with an amount of Reinecke's salt solution and allowed to precipitate. A colored solution is collected from each precipitated mixture in step 306. In step 308, a chart of colored solutions and corresponding amine-based shale inhibitor concentrations is prepared. One or more samples of circulating drilling fluid having an unknown concentration of amine-based shale inhibitor is obtained in step 310. Finally, in step 312, the concentration of amine-based shale inhibitor in the one or more samples of circulating drilling fluid is estimated so that effective shale inhibition can be achieved during drilling.

EXAMPLES

Example 1—Detection of Amine-Based Shale Inhibitor in Aqueous Solutions

The reaction of varying concentrations of amine-based shale inhibitor with Reinecke's salt was investigated. KLA-STOP polyamine shale inhibitor was used as the amine-based shale inhibitor. KLA-STOP is commercially available through SLB located at 509 W Hensley Blvd, Bartlesville, OK 74003. The objective of the experiments was to establish a relationship between varying amine concentration and absorption intensity by UV-visible spectroscopy.

The following procedure was followed during the investigation. First, aqueous solutions of KLA-STOP, or other amine-based shale inhibitor, at different concentrations were prepared in a range of 0 pounds per barrel (ppb) to 20 ppb, such as 0.5 ppb, 1 ppb, 2 ppb, 4 ppb, 6 ppb, 8 ppb, 10 ppb, and 20 ppb. In some embodiments, the varying concentrations of KLA-STOP are selected from a range of 0 ppb to 2 ppb, 2 ppb to 4 ppb, 4 ppb to 8 ppb, 6 ppb to 10 ppb, 10 ppb to 16 ppb, or 16 ppb to 20 ppb. A solution of Reinecke's salt indicator solution was prepared by dissolving approximately 3% w/w (weight by weight) of Reinecke's salt into deionized water and filtered through a 0.45 micrometer (μm) filter.

Approximately 4 milliliters (ml) of water, approximately 1 ml of 3% w/w Reinecke's salt solution, and approximately 1 ml of drilling mud filtrate was added to a small vial. The container was shaken to mix the solution then kept static for 30 minutes to allow the precipitate to settle to the bottom of the vial. A clear, colored (e.g., pink) solution was removed from the top of the vial using a syringe equipped with a 0.45 μm syringe filter. The solution may also be centrifuged to separate out the precipitate and subsequently filtered to obtain a clear solution. The absorption intensity of the clear, colored solutions was measured using a UV-Visible spectrophotometer. Each colored solution is characterized by at least one absorption peak wavelength in a range of about 400 nanometers (nm) to about 800 nm.

A decrease in color of the Reinecke's salt solution with the increase in concentration of the amine (KLA-STOP) from 0.5 ppb to 10 ppb in aqueous solutions was observed. The discoloration ranged from the original dark pink to light pink. The discoloration of the Reinecke's salt solution depended on the concentration of amine. The greater the amount of amine present in aqueous solution, the greater the extent of discoloration of Reinecke's salt solution. The extent of discoloration was measured using UV-visible absorbance spectroscopy in terms of decrease in absorbance. The solutions were characterized by an absorption peak wavelength $\lambda_{max}$=522 nm±2 nm in the range from approximately 350 nanometers (nm) to approximately 700 nm.

Figure 4:
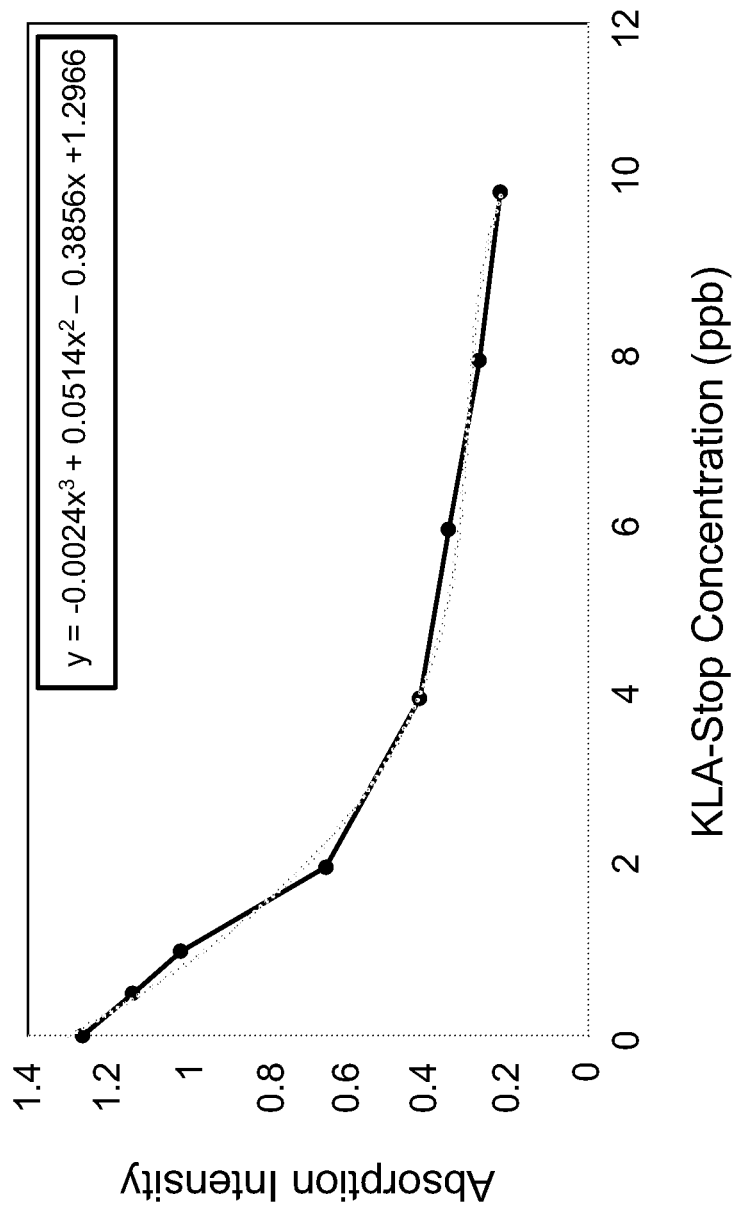
FIG. 4 illustrates the relationship of absorption intensity values measured at an absorption peak wavelength and amine-based shale inhibitor concentration according to embodiments of the present disclosure.

FIG. 4 illustrates the relationship of absorption intensity values measured at absorption peak wavelength $\lambda_{max}$=522 nm and KLA-STOP concentration. As shown, the absorption intensity values of the KLA-STOP solutions decrease with the corresponding increase in its concentration.

Example 2—Detection of Amine-Based Shale Inhibitor in Water-Based Drilling Fluids The reaction of KLA-STOP polyamine shale inhibitor in water-based drilling fluids with Reinecke's salt was investigated. The objective was to determine a relationship between different concentrations of KLA-STOP in the water-based drilling fluids and absorption intensity obtained from UV-Visible spectroscopy. The relationship can then be used to track the concentration of amine-based shale inhibitor in a drilling fluid circulating through a wellbore.

The following procedure was performed to determine a relationship between varying KLA-STOP concentrations in water-based drilling fluids and the absorption intensity values measured at absorption peak wavelength $\lambda_{max}$. Different 75 pounds-force per cubic foot (pcf) water-based drilling fluids with different concentrations of KLA-STOP, including 0 pounds per barrel (ppb), 2 ppb, 4 ppb, 6 ppb, 8 ppb, and 10 ppb were formulated. The water-based drilling fluids compositions are listed in Table 1.

TABLE 1

| Additives | Mixing time, min | Fluid 1 | Fluid 2 | Fluid 3 | Fluid 4 | Fluid 5 | Fluid 6 |
|---|---|---|---|---|---|---|---|
| Water, ppb | | 310.3 | 308.5 | 306.7 | 304.9 | 303.1 | 301.3 |
| NaCl, ppb | 2 | 55.00 | 55.00 | 55.00 | 55.00 | 55.00 | 55.00 |
| XC polymer | 5 | 0.50 | 0.50 | 0.50 | 0.50 | 0.50 | 0.50 |

TABLE 1-continued

| Additives | Mixing time, min | Fluid 1 | Fluid 2 | Fluid 3 | Fluid 4 | Fluid 5 | Fluid 6 |
|---|---|---|---|---|---|---|---|
| PAC L, ppb | 5 | 2.00 | 2.00 | 2.00 | 2.00 | 2.00 | 2.00 |
| KLA Stop, ppb | 5 | 0 | 2 | 4 | 6 | 8 | 10 |
| Caustic, ppb | 5 | 0.50 | 0.50 | 0.50 | 0.50 | 0.50 | 0.50 |
| Barite, ppb | 5 | 52.2 | 51.9 | 51.8 | 51.6 | 51.4 | 51.2 |

American Petroleum Institute (API) low-temperature and low-pressure fluid loss measurements were performed on the drilling fluid samples and the corresponding API mud filtrates were collected. A Reinecke's salt indicator solution was prepared by dissolving approximately 3% w/w by weight of the Reinecke's salt reagent into deionized water. To a small vial or bottle, about 4 ml water, about 1 ml of 3% w/w Reinecke's salt solution, and about 1 ml of the API filtrate was added. The vial was shaken slightly for the ingredients to mix properly. The vial was kept static for approximately 30 min, and the precipitate was allowed to settle. The pink colored solution was removed from the top of the vial using a syringe and filtered through a 0.45-micron filter. Alternatively, the solution may be centrifuged to separate out the precipitate to get a clear solution. The intensity of the pink color decreased with the increase in KLA-STOP concentration in the water-based drilling fluid. In other words, the solution is discolored to an extent that is dependent on the concentration of KLA-STOP amine-based shale inhibitor.

Figure 5:
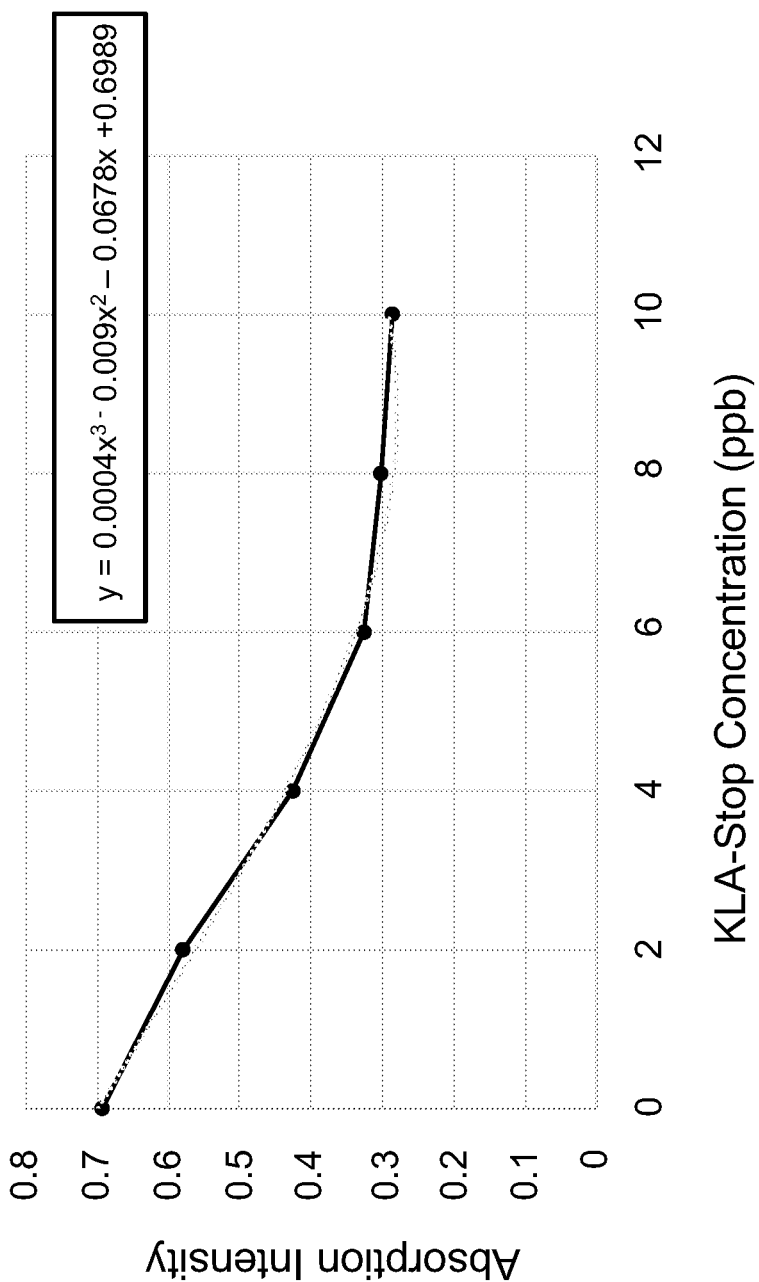
FIG. 5 illustrates absorption intensity at an absorbance peak wavelength for the samples of water-based drilling fluids according to embodiments of the present disclosure.

UV-Visible spectroscopy was performed on the clear solutions obtained after filtration. The absorption intensity was determined at absorbance peak wavelength $\lambda_{max}$ 522 nm±2 nm. FIG. 5 shows a calibration plot of absorption intensity at absorbance peak wavelength $\lambda_{max}$ 522 nm±2 nm for the six water-based drilling fluids. A relationship (calibration plot) of different concentrations of KLA-STOP amine-based shale inhibitor and absorption intensity was, thus, established for the 75 pcf drilling fluids.

Example 3—Method to Determine Amine-Based Shale Inhibitor Concentration in Water-Based Drilling Fluids in Real-Time During Drilling Using UV-Visible Spectroscopy The following method was used to determine the concentration of amine-based shale inhibitor in real-time conditions during drilling. A calibration plot was generated that establishes a relationship between varying concentrations of amine-based shale inhibitor in the drilling fluid and absorption intensity according to the procedure described above. API low-temperature and low-pressure fluid loss measurements were performed on circulating drilling fluid to obtain an API filtrate for the circulating drilling fluid.

About 4 ml water, about 1 ml of 3% w/w Reinecke's salt solution, and about 1 ml of the API filtrate of the circulating drilling fluid was added to a small vial then shaken slightly to mix the components. The vial was kept static for approximately 30 min to allow the precipitate to settle. The pink colored solution was removed from the top of the vial using a syringe and filtered through a 0.45-micron filter. Alternatively, the solution may be centrifuged to separate out the precipitate to get a clear solution. The absorption intensity of the clear solution at absorbance peak wavelength $\lambda_{max}$ was measured. The concentration of amine-based shale inhibitor was estimated from the calibration plot.

In one or more embodiments, real time monitoring and analysis of the circulating drilling fluid is performed since the shale inhibitor may be consumed during drilling. The circulating drilling fluid may be analyzed at any time during drilling to ensure a desired concentration of shale inhibitor to drilling fluid is maintained. In one or more embodiments, the shale inhibitor concentration is maintained at 2% v/v to 3% v/v of the drilling fluid.

Example 4—Method to Determine Amine-Based Shale Inhibitor Concentration in Water-Based Drilling Fluids in Real-Time During Drilling Through Visual Observation In another embodiment, a quick method to estimate the amine concentration in a circulating drilling fluid is through visual observation of color of Reinecke's salt-amine complex solution obtained from API mud filtrate of circulating drilling fluid. A reference color chart of decreasing colored solutions of different amine-based shale inhibitor concentration in a drilling fluid was prepared. A colored solution was obtained by reacting Reinecke's salt with the API filtrate of the circulating drilling fluid, as described above. The color of the colored solution obtained from the circulating drilling fluid was compared with the reference color chart and the amine-based shale inhibitor concentration was estimated.

Embodiments of the present disclosure provide at least one of the following advantages. Formations that contain hydratable shale or mixed layers of reactive clay can lead to wellbore instability issues. The analytical method described herein may be utilized to track shale inhibitor concentration through quantitative measurements. As a result, it is possible to achieve effective shale inhibition, thereby improving wellbore stability, maximizing drilling efficiency, and enhancing control over the wellbore. Ultimately, economic losses resulting from inefficient drilling and loss of non-productive time may be reduced.

While the experiments described in this disclosure used the KLA-STOP amine-based shale inhibitor, the method according to embodiments of the present disclosure is not limited to this type of amine-based shale inhibitor. Other amine-based inhibitors may be analyzed following generation of a calibration curve as described above.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A method for quantifying and tracking an amine-based shale inhibitor in a drilling fluid through UV-visible spectroscopy, comprising:
    for a plurality of varying concentrations of the amine-based shale inhibitor, determining a correlation between a concentration of the amine-based shale inhibitor in a water-based drilling fluid sample and an ultraviolet (UV)-visible absorption intensity;

generating a calibration plot of the correlations;
obtaining one or more samples of a circulating drilling fluid having an unknown concentration of the amine-based shale inhibitor;
using the calibration plot, estimating the concentration of the amine-based shale inhibitor in the one or more samples of the circulating drilling fluid;
formulating a plurality of water-based drilling fluid samples having a plurality of varying concentrations of the amine-based shale inhibitor;
collecting a mud filtrate from each water-based drilling fluid sample;
mixing an amount of each mud filtrate with an amount of an amine precipitating reagent and allowing each mixture to precipitate;
collecting a colored solution from each precipitated mixture; and
performing UV-visible spectroscopy on each colored solution to measure the UV-visible absorption intensity of each colored solution,
wherein the UV-visible absorption intensity of each colored solution decreases with an increase in the concentration of the amine-based shale inhibitor.

2. The method of claim 1, wherein each colored solution is characterized by at least one absorption peak wavelength in a range of about 400 nanometers (nm) to about 800 nm.

3. The method of claim 1, wherein the amine precipitating reagent is Reinecke's salt.

4. The method of claim 1, wherein the plurality of varying concentrations of the amine-based shale inhibitor comprises 0 pounds per barrel (ppb), 2 ppb, 4 ppb, 6 ppb, 8 ppb, and 10 ppb.

5. The method of claim 1, further comprising maintaining the concentration of the amine-based shale inhibitor in the one or more samples of the circulating drilling fluid from about 2% v/v to 3% v/v of the circulating drilling fluid.

6. A method for quantifying and tracking an amine-based shale inhibitor in a drilling fluid through visualization, comprising:
formulating a plurality of water-based drilling fluid samples having a plurality of varying concentrations of the amine-based shale inhibitor;
collecting a mud filtrate from each water-based drilling fluid sample;
mixing an amount of each mud filtrate with an amount of an amine precipitating reagent and allowing each mixture to precipitate;
collecting a colored solution from each precipitated mixture;
preparing a chart of colored solutions and corresponding amine-based shale inhibitor concentrations,
obtaining one or more samples of a circulating drilling fluid having an unknown concentration of the amine-based shale inhibitor; and
using the chart, estimating the concentration of the amine-based shale inhibitor in the one or more samples of the circulating drilling fluid,
wherein a color intensity of the colored solution decreases with an increase in the concentration of the amine-based shale inhibitor.

7. The method of claim 6, wherein the plurality of varying concentrations of the amine-based shale inhibitor range from 0 pounds per barrel (ppb) to 20 ppb.

8. The method of claim 6, wherein the plurality of varying concentrations of the amine-based shale inhibitor range from 0 ppb to 2 ppb.

9. The method of claim 6, wherein the plurality of varying concentrations of the amine-based shale inhibitor range from 2 ppb to 4 ppb.

10. The method of claim 6, wherein the plurality of varying concentrations of the amine-based shale inhibitor range from 4 ppb to 8 ppb.

11. The method of claim 6, wherein the plurality of varying concentrations of the amine-based shale inhibitor range from 6 ppb to 10 ppb.

12. The method of claim 6, wherein the plurality of varying concentrations of the amine-based shale inhibitor range from 10 ppb to 16 ppb.

13. The method of claim 6, wherein the plurality of varying concentrations of the amine-based shale inhibitor range from 16 ppb to 20 ppb.

14. The method of claim 6, wherein the amine precipitating reagent is Reinecke's salt.

15. The method of claim 6, further comprising maintaining the concentration of the amine-based shale inhibitor in the one or more samples of the circulating drilling fluid from about 2% v/v to 3% v/v of the circulating drilling fluid.

* * * * *